3,358,003
FLUOROCARBON EPOXIDES
Herbert Sousa Eleuterio, Wilmington, Del., and Robert Walter Meschke, Grifton, N.C., assignors to E. I. du Pont de Nemours and Company, Wilmington, Del., a corporation of Delaware
No Drawing. Filed June 5, 1961, Ser. No. 114,597
23 Claims. (Cl. 260—348)

This application is a continuation-an-part of copending application Ser. No. 827,683, filed July 17, 1959, now abandoned, and copending application Ser. No. 35,107, filed June 10, 1960, now abandoned.

The present invention relates to novel oxygen-containing fluorocarbon compounds, and, more particularly, to novel fluorocarbon epoxides and a method for their preparation.

Hydrocarbon epoxides have found substantial industrial utility as monomers in the formation of polyether resins which can be cross-linked to give plastics of outstanding mechanical properties. It will thus be apparent that the formation of fluorocarbon epoxides and the polymerization of such to polyether type of resins may lead to fluorocarbon polyethers having rigidity substantially above that of fluorocarbon resins now known in the art. Some oxygen-containing fluorocarbon ring compounds have been formed heretofore by the electrolysis of the corresponding hydrocarbon compound with hydrogen fluoride. This method, although suitable for the preparation of research quantities of such materials, is considered not to be suitable for the preparation of commercial quantities of oxygen-containing fluorocarbon ring compounds such as are used as monomers in a polymerization process. Not only is this technique uneconomical, but it also leads to a whole host of products, including the desired product, the separation of which is difficult, since each hydrogen of the hydrocarbon compound must be individually substituted by an electrolytic reaction with hydrogen fluoride.

It is, therefore, the object of the present invention to provide novel fluorocarbon epoxides suitable as chemical intermediates and as polymerization monomers. It is a further object of the present invention to provide a process for the preparation of fluorocarbon epoxides. It is another object of the present invention to provide a process for the non-electrolytic manufacture of fluorocarbon epoxides. It is still another object of the present invention to provide a simple and economic process for the manufacture of epoxides which give rise to comparatively pure fluorocarbon epoxides. Other objects will become apparent hereinafter.

The objects of the present invention are accomplished by a process which comprises contacting a fluoroolefin having the general formula

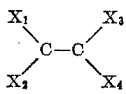

where $X_1$, $X_2$, and $X_3$ are members of the class consisting of fluorine and perfluoroalkyl radicals, $X_4$ is a member of the class consisting of perfluoroalkyl and omega-hydroperfluoroalkyl radicals, and where $X_1$ and $X_4$, when combined, are a perfluoroalkylene radical, with an alkaline aqueous solution of an inorganic peroxide at a temperature of $-50$ to $+50°$ C.

The novel fluoroolefin epoxides obtained by the process of the present invention have the general formula

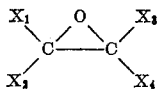

where $X_1$, $X_2$, $X_3$ and $X_4$ have the same meaning as above, and are characterized by a strong absorption band in the infrared spectrum at 6.0 to 7.5 microns, which is characteristic of substantially completely fluorinated olefin epoxides and is not found in other perfluorocarbon compounds. The fluoroolefin epoxides of the present invention are extremely reactive compounds which readily react with organic amines and bases and, furthermore, readily isomerize to the corresponding acid fluoride. The epoxides formed from terminally unsaturated perfluoroolefins can be subjected to polymerization with anionic catalysts.

The novel epoxides of the present invention are preferably prepared by the reaction of the fluoroolefin in an alkaline environment with hydrogen peroxide. In general, water is employed as the reaction medium, although the aqueous medium may be modified by the addition of water-miscible organic compounds such as acetone, methanol, ethanol, and/or acetaldehyde, to allow carrying out of the reaction at lower temperatures, for example. Aliphatic alcohols, ketones, aldehydes and esters are particularly preferred. The quantity of the water-miscible organic solvent employed is not critical and depends on the reaction conditions employed. The reaction temperature is generally maintained between $-50°$ C. and $+50°$ C., the preferred range being from $-45°$ to $0°$ C. The formation of the epoxide occurs at a pH of greater than 7, i.e., in an alkaline medium. The nature of the compound employed to give rise to the necessary pH is not critical and either a base or a basic salt may be employed. Suitable bases are sodium hydroxide, potassium hydroxide, ammonium hydroxide and the like. Suitable basic salts include such compounds as sodium carbonate, sodium bicarbonate, sodium acetate and potassium acetate. The hydrogen peroxide employed is generally added to the reaction vessel in the form of an aqueuos solution. Excess quantities of the hydrogen peroxide, based on the fluoroolefin to be epoxidized, are generally employed. Although hydrogen peroxide is the preferred oxidizing agent, other oxidizing agents of equal strength, such as sodium hypochlorite, can also be employed. The reaction between hydrogen peroxide and the fluoroolefin may be improved by the addition of a fluorinated dispersing agent, such as described in U.S. 2,559,752, issued to K. L. Berry on July 10, 1951. Fluoroolefins which are suitable in the formation of fluorocarbon epoxides include hexafluoropropylene, perfluorobutene-1, perfluorropentene-1, perfluoroheptene-1, perfluorodecene-1, omega-hydroperfluorohexene-1, omega-hydroperfluorooctene-1, perfluorobutene-2, perfluoroisobutene, perfluorocyclohexene, and similar fluoroolefins containing a larger number of carbon atoms. Although the number of carbon atoms in the fluorroolefin does not affect its ability to form the epoxide in accordance with the process of the present invention, fluoroolefins having more than 20 carbon atoms are not readily available and no advantage is obtained from epoxides of such fluoroolefins as compared to the epoxides specifically described below.

The fluorocarbon epoxides formed may be separated by distillation from the reaction mixture. For purposes of analysis, extremely pure fluorocarbon epoxides are obtained through gas chromatography.

The invention is further illustrated by the following examples.

*Example 1*

Into a reaction flask was charged 300 g. of water, containing 40 g. of sodium hydroxide and 0.5 g. of sodium perfluorocaprylate. To the mixture was added under agitation 113 g. of an aqueous 30% hydrogen peroxide solution. The reaction temperature was adjusted to 22° C. and hexafluoropropylene, at a rate of 0.068 l./min. was delivered to the well-agitated mixture below the level of the liquid by means of a gas dispersion tube. The off-gas was collected in a cold trap from which the product, hexafluoropropylene epoxide, could be distilled. The off-gas was found to contain between 25 and 30% of hexafluoropropylene epoxide. A pure sample of hexafluoropropylene epoxide, obtained by gas chromatography, was found to have an infrared band at 6.43 microns, a boiling point of $-27.4 \pm 1°$ C. Fluorine analysis verified the compound to have the general formula $C_3F_6O$. A stream containing approximately 10% of the epoxide was passed through a quartz tube maintained at 250° C. The effluent was conducted to two scrubbers containing methanol at 0° C. From the methanol solution, methyl perfluoropropionate was isolated.

*Example II*

Example I was repeated using 160 g. of sodium carbonate instead of 40 g. of sodium hydroxide. The effluent from the reactor was found to contain 5% of hexafluoropropylene epoxide.

*Example III*

Using the procedure of Example I, 15 g. of perfluoroheptene-1 was reacted, in a medium of 25 g. of ethanol and 25 g. of water, with 88 g. of a 30% hydrogen peroxide solution and 10 g. of sodium hydroxide. The reaction temperature was maintained at 0° C. for a period of one hour. The resulting reaction mixture was found to contain perfluoro-1,2-epoxy-heptane.

*Example IV*

Into a reaction vessel was charged 750 ml. of methanol, 84 g. of potassium hydroxide dissolved in 150 ml. of water, and 525 ml. of 30% hydrogen peroxide. The reaction vessel was cooled to $-40°$ C., at which temperature the reaction mixture was maintained throughout the synthesis. To the resulting reaction mixture was added 80 ml. of liquid hexafluoropropylene at $-30°$ C. This reaction mixture was agitated for 1.5 hours. There was isolated from the reaction mixture 62.8 g. of material comprising 35% of unreacted hexafluoropropylene and 65% of hexafluoropropylene epoxide.

*Example V*

Into a reaction vessel maintained at $-30°$ C. was charged 250 ml. of acetone, 76.7 g. of barium oxide and 100 ml. of water, 175 ml. of 30% aqueous solution of hydrogen peroxide and 20 ml. of hexafluoropropylene. The reaction was continued for 1.5 hours. From the reaction mixture there was obtained 0.32 g. of hexafluoropropylene epoxide.

*Example VI*

The procedure of Example V was repeated with the exception that 20 g. of sodium hydroxide in 50 ml. of water, instead of the 76.7 g. of barium oxide in 100 ml. of water, was used. The off-gases from the reaction mixture contained 29% of hexafluoropropylene epoxide.

*Example VII*

Into a 3-necked, 500 ml. round-bottomed flask equipped with a dropping funnel, stirrer and reflux condenser whose outlet was attached to a cold trap, was placed a solution of 8.0 g. (0.22 mole) of sodium hydroxide, 200 ml. of water and 22.7 g. (0.20 mole) of 30% hydrogen peroxide. The stirring was started and 19.8 g. (0.066 mole) of perfluoro-2-methyl-2-pentene was added dropwise to the alkaline peroxide solution. When the addition was complete, the rate of stirring was increased and maximum agitation of the reaction mixture was obtained. The reaction was carried out for 18 hours. The reaction mixture was then transferred to a separatory funnel, and the bottom layer collected. This material was combined with similar material collected from the cold trap. There was thus obtained 10.2 g. of a mixture of perfluoro-2-methyl-2-pentene and perfluoro-2,3-epoxy-2-methylpentane. This mixture contained 76% of the latter compound. Isolation of pure perfluoro-2,3-epoxy-2-methylpentane was accomplished by gas chromatographic separation of the mixture. The perfluoro-2,3-epoxy-2-methylpentane obtained in this manner was shown by infrared and nuclear magnetic resonance studies to be about 97% pure. Differential thermal analysis gave a boiling point of $57 \pm 0.5°$ C. and a glass transition at $-45 \pm 5°$ C., and no melting point for the compound. The characteristic infrared absorption band was at 6.85 microns.

*Example VIII*

Into a 3-necked, 500 ml., round-bottomed flask equipped with a dropping funnel, stirrer and reflux condenser, was placed a solution of 11.2 g. (0.24 mole) of potassium hydroxide and 30.6 g. (0.27 mole) of 30% hydrogen peroxide in 150 ml. of methanol. The reaction flask and its contents were kept at 0° C. during the reaction by means of an ice-water bath which surrounded the flask. To the stirred alkaline peroxide solution was added dropwise 20.0 g. (0.67 mole) of trans-perfluoro-4-methyl-2-pentene and the resulting mixture stirred vigorously for 50 min. and transferred to a separatory funnel. The bottom layer (8.6 g.) was collected and distilled. The distillation was not effective in completely separating the mixture of perfluoro-2,3-epoxy-4-methylpentane and trans-perfluoro-4-methyl-2-pentene. The middle cut from the distillation contained 63% epoxide. Pure perfluoro-2,3-epoxy-4-methylpentane was obtained from this fraction by gas chromatographic separation.

The perfluoro-2,3-epoxy-4-methylpentane obtained in this manner was shown to be pure by infrared and nuclear magnetic resonance studies and carbon, fluorine analyses.

Calculated for $C_6F_{12}O$: 22.8% C, 72.1% F. Found: 23.0% C, 70.3%, 70.8% F.

Differential thermal analysis gave a boiling point of $53 \pm 1°$ C. and a glass transition at $-75 \pm 5°$ C. and no melting point for the compound. The characteristic infrared absorption band was at 6.61 microns.

*Example IX*

A mixture of 11.2 g. (0.20 mole) of potassium hydroxide, 20 ml. of water, 100 ml. of methanol and 22.7 g. (0.22 mole) of 30% hydrogen peroxide was divided equally into two 21 cm. x 1.2 cm. Pyrex tubes. A stream of octafluoro-2-butene, flowing at approximately 8 ml./min., was passed first through the solution in one tube and then through the solution in the other. The exit gases were condensed in a cold trap placed after the second tube. The reaction was carried out at room temperature.

The exit gas consisted of a mixture of octafluoro-2-butene and octafluoro-2,3-epoxybutane, the latter having a characteristic infrared absorption band at 6.65 microns.

*Example X*

Into a 3-necked, one liter round-bottomed flask equipped with a dropping funnel, stirrer and gas outlet tube connected to a cold trap in Dry Ice-acetone mixture was placed a solution of 33.6 g. (0.72 mole) of potassium hydroxide and 90 g. (0.79 mole) of 30% hydrogen peroxide in 500 ml. of water. The reaction flask and its contents were cooled to 10° C., the cooling bath removed, the stirrer started and 37 g. (0.17 mole) of perfluorocyclopentene added rapidly to the reaction mixture. The reaction was continued until no fluorocarbon material remained in the reaction flask. The cold trap contained 25 g. of a mixture of perfluorocyclopentene and octafluoro-1,2-epoxycyclopentane. Infrared and gas chromatographic analysis showed that the mixture contained approximately 8% of the epoxide. Isolation of the gas sample of octafluoro-1,2-epoxycyclopentane was accomplished by gas chromatographic separation of the mixture. The characteristic infrared absorption band was at 6.55 microns.

Example XI

Into a 3-necked, 500 ml. round-bottomed flask equipped with a dropping funnel, stirrer and reflux condenser was placed a solution of 11.2 g. (0.24 mole) of potassium hydroxide and 30.6 g. (0.27 mole) of 30% hydrogen peroxide in 150 ml. of methanol. The reaction flask and its contents were kept at 0° C. during the reaction by means of an ice-water bath which surrounded the flask. To the stirred alkaline peroxide solution was added dropwise 30.0 g. (0.67 mole) of perfluoro-2,3,5-trimethyl-2-hexene and the resulting mixture stirred vigorously for one hour and transferred to a separatory funnel. The bottom layer (16.0 g.) was collected and distilled through a 30 x 1 cm. column packed with heli-pack .036″ x .070″ x .070″ stainless steel packing. The middle fraction of this distillation, B.P. 36–39° C./1 mm. consisted mainly of a material whose infrared spectrum contained a band at 7.2 microns. The isolated product was found to be perfluoro-2,3-epoxy-2,3,5-trimethylhexane.

Example XII

Into a 3-necked, 500 ml., round-bottomed flask equipped with a dropping funnel, stirrer and reflux condenser was placed a solution of 11.2 g. (0.24 mole) of potassium hydroxide and 30.6 g. (0.27 mole) of 30% hydrogen peroxide in 150 ml. of methanol. The reaction flask and its contents were kept at 0° C. during the reaction by means of an ice-water bath which surrounded the flask. To the stirred alkaline peroxide solution was added dropwise 30.0 g. (0.67 mole) of perfluoro-2,3,5-trimethyl-3-hexene and the resulting mixture stirred vigorously for one hour and transferred to a separatory funnel. The lower layer was collected (20 g.) and shown by gas chromatographic techniques to contain about 2% starting material, 3% higher boiling material, 5% low boilers, and 90% of a material possessing an infrared absorption band at 6.95 microns. This product was identified as perfluoro-3,4-epoxy-2,3,5-trimethylhexane.

Example XIII

Following the procedure of Example VII, perfluoro-1,2-epoxyisobutane was prepared from perfluoroisobutene. Perfluoro-1,2-epoxyisobutane was found to have a boiling point at 3°±1° C., and a melting point at −122°±1° C. The characteristic infrared absorption band was found at 6.66 microns.

Example XIV

Following the procedure of Example VII, 8-hydroperfluoro-1,2-epoxyoctane was prepared from 8-hydroperfluoro-1-octene. The product isolated, 8-hydroperfluoro-1,2-epoxyoctane, was found to have a boiling point at +123°±0.5° C., and a melting point at 69°±0.5° C. The characteristic infrared absorption band of perfluoro-olefin epoxides was found at 6.47 microns.

The examples have illustrated the process of the present invention and are not intended as limiting the invention. Thus, the experimental procedure set forth in the examples can be employed in the formation of epoxides other than those shown in the examples from fluoroolefins having the general formula shown above. Other modifications and equivalencies will be apparent to one skilled in the art.

We claim:

1. A fluorocarbon epoxide containing up to 20 carbon atoms and having the formula

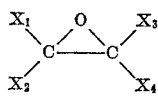

where $X_1$, $X_2$ and $X_3$ are of the class consisting of fluorine and perfluoroalkyl, $X_4$ is a member of the class consisting of perfluoroalkyl and omega-hydroperfluoroalkyl, and where $X_1$ and $X_4$, when combined, are perfluoroalkylene, said fluorocarbon epoxide being characterized by a strong absorption band at 6 to 7.5 microns in the infrared spectrum.

2. A fluorocarbon epoxide containing up to 20 carbon atoms and having the formula

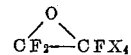

wherein $X_4$ is a perfluoroalkyl, said fluorocarbon epoxide being characterized by a strong absorption band at 6 to 7.5 microns in the infrared spectrum.

3. Hexafluoropropylene epoxide having a boiling point at atmospheric pressure at −27.4±1° C. and a strong absorption band at 6.43 microns in the infrared spectrum.

4. 8-hydroperfluoro-1,2-epoxyoctane having a boiling point at atmospheric pressure at +123°±0.5° C., and a strong absorption band at 6.47 microns in the infrared spectrum.

5. A fluorocarbon epoxide containing up to 20 carbon atoms and having the formula

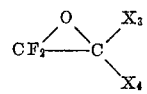

where $X_3$ and $X_4$ are perfluoroalkyl, said fluorocarbon epoxide being characterized by a strong absorption band at 6 to 7.5 microns in the infrared spectrum.

6. Perfluoro-1,2-epoxy-2-methylpropane having a boiling point at atmospheric pressure at +3±1° C. and a strong absorption band at 6.66 microns in the infrared spectrum.

7. A fluorocarbon epoxide containing up to 20 carbon atoms and having the formula

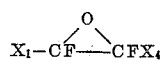

where $X_1$ and $X_4$ are perfluoroalkyl, said fluorocarbon epoxide being characterized by a strong absorption band at 6 to 7.5 microns in the infrared spectrum.

8. Perfluoro-2,3-epoxybutane having a strong absorption band at 6.65 microns in the infrared spectrum.

9. Perfluoro-2-methyl-3,4-epoxyfluoropentane having a boiling point at 53±1° C. and a strong absorption band at 6.61 microns in the infrared spectrum.

10. A fluorocarbon epoxide containing up to 20 carbon atoms and having the formula

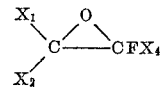

where $X_1$, $X_2$ and $X_4$ are perfluoroalkyl, said fluorocarbon epoxide being characterized by a strong absorption band at 6 to 7.5 microns in the infrared spectrum.

11. Perfluoro-2-methyl-2,3-epoxypentane having a boiling point at atmospheric pressure at +57±0.5° C. and a strong absorption band at 6.85 microns in the infrared spectrum.

12. Perfluoro-2,3,5-trimethyl-3,4-epoxyhexane having a strong absorption band at 6.95 microns in the infrared spectrum.

13. A fluorocarbon epoxide having the formula

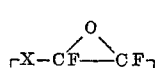

where X is perfluoroalkylene having from 3 to 4 carbon atoms, said fluorocarbon epoxide being characterized by a strong absorption band at 6 to 7.5 microns in the infrared spectrum.

14. Octafluoro-1,2-epoxycyclopentane having a strong absorption band at 6.55 microns.

15. A fluorocarbon epoxide containing up to 20 carbon atoms and having the formula

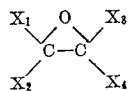

where $X_1$, $X_2$, $X_3$ and $X_4$ are perfluoroalkyl, said fluorocarbon epoxide being characterized by a strong absorption band at 6 to 7.5 microns in the infrared spectrum.

16. Perfluoro-2,3,5-trimethyl-2,3-epoxyhexane having a strong absorption band at 7.2 microns in the infrared spectrum.

17. A process for the preparation of fluorocarbon epoxides which comprises contacting a fluoroolefin containing up to 20 carbon atoms and having the formula

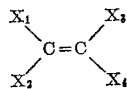

where $X_1$, $X_2$, and $X_3$ are of the class consisting of fluorine and perfluoroalkyl, $X_4$ is a member of the class consisting of perfluoroalkyl and omega-hydroperfluoroalkyl, and where $X_1$ and $X_4$ when combined are perfluoroalkylene with an alkaline aqueous solution of hydrogen peroxide at a temperature of −50 to +50° C.

18. The process as set forth in claim 17 wherein the hydrogen peroxide is dissolved in aqueous sodium hydroxide.

19. The process as set forth in claim 17 wherein the aqueous solution comprises water and a water-miscible alcohol.

20. The process of claim 17 wherein the fluoroolefin is hexafluoropropylene.

21. The process of claim 17 wherein the fluoroolefin is perfluorocyclopentene.

22. The process of claim 17 wherein the fluoroolefin is perfluoroisobutene.

23. The process of claim 17 wherein the fluoroolefin is perfluorobutene-2.

References Cited

UNITED STATES PATENTS

| | | | |
|---|---|---|---|
| 2,321,823 | 6/1943 | Kirkbride. | |
| 2,451,185 | 10/1948 | Whaley | 260—348 |
| 2,700,686 | 1/1955 | Dickey et al. | 260—348 |
| 2,724,719 | 11/1955 | Markley et al. | 260—348 |
| 2,431,718 | 12/1947 | Wilder et al. | 260—348.5 |
| 2,519,983 | 8/1950 | Simons | 204—59 |
| 2,784,234 | 3/1957 | Dodson | 260—348.5 |
| 2,947,761 | 8/1960 | Payne | 260—348.5 |
| 3,053,856 | 9/1962 | Payne et al. | |
| 3,065,245 | 11/1962 | Latourette et al. | |

FOREIGN PATENTS

| | | |
|---|---|---|
| 672,720 | 5/1952 | Great Britain. |
| 814,002 | 9/1951 | Germany. |
| 947,364 | 8/1956 | Germany. |
| 1,275,799 | 10/1961 | France. |
| 1,359,426 | 3/1964 | France. |

OTHER REFERENCES

Karrer: Organic Chemistry, 2nd ed., pp. 92–102 (1946).
McBee et al.: J.A.C.S., vol. 75, pp. 1609–10 (1953).
McBee et al.: J.A.C.S., vol. 75, pp. 4091–2 (1953).
Wasserman et al.: J.A.C.S., vol. 77, pp. 590–4 (1955).
Smith et al.: Indust. and Eng. Chem., vol. 49, pp. 1241–6 (1957).
Weitz et al.: Berichte, vol. 54, pp. 2327–44.
Friess, S. L.: "Tech. of Org. Chem.," vol. 8 (1953), pp. 412–413.
Houben-Weyl: Methoden der Organischen Chemie, vol. 6/3, pp. 384, 396–398; vol. 14/2, p. 494.
Wallace: Hydrogen Peroxide in Organic Chemistry (1960), pp. 32, 33, published by Du Pont.
Caglioti: Nature, vol. 201, pp. 610–11 (February 1964).

NORMA S. MILESTONE, *Primary Examiner.*

IRVING MARCUS, NICHOLAS S. RIZZO,
*Examiners.*

J. P. FRIEDENSON, *Assistant Examiner.*